April 14, 1959      M. G. McLEAN      2,881,710
SHAFT SEAL WITH REPLACEABLE SLEEVE
Filed Aug. 22, 1955
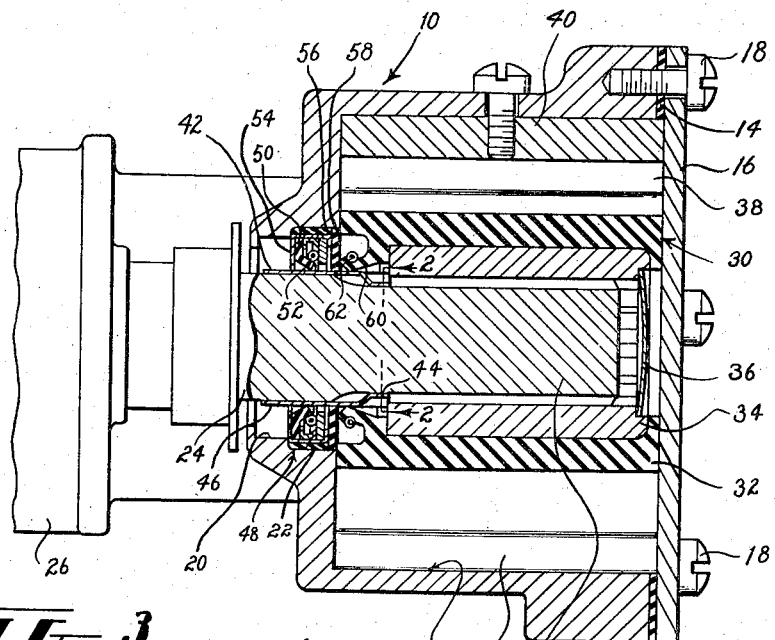
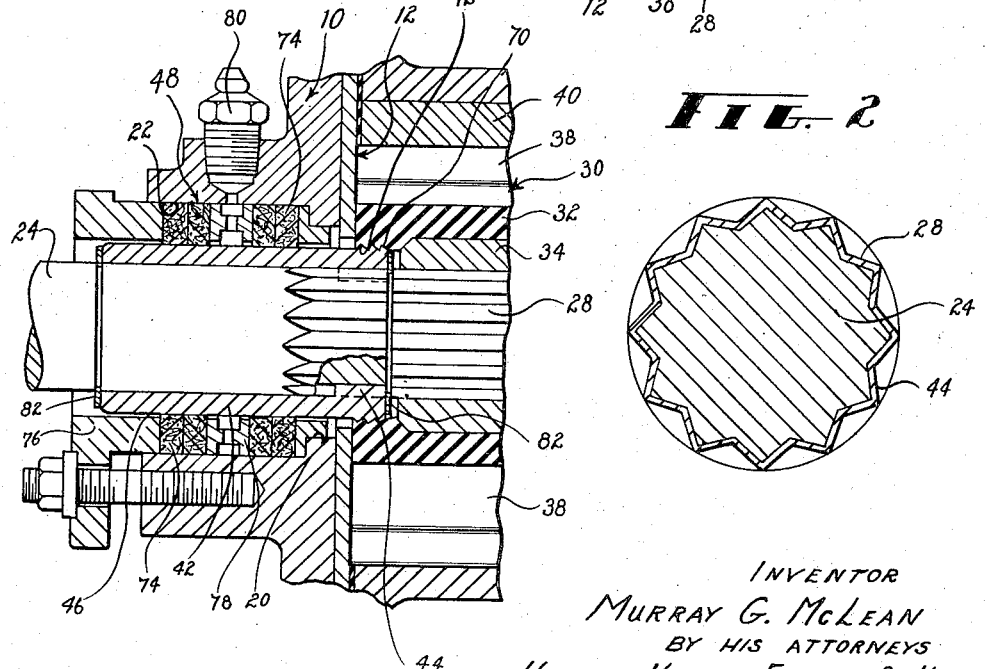
INVENTOR
MURRAY G. McLEAN
BY HIS ATTORNEYS
HARRIS, KIECH, FOSTER, & HARRIS

United States Patent Office 2,881,710
Patented Apr. 14, 1959

2,881,710
SHAFT SEAL WITH REPLACEABLE SLEEVE

Murray G. McLean, Burbank, Calif., assignor to Jabsco Pump Company, Burbank, Calif., a corporation of California Application August 22, 1955, Serial No. 529,685

3 Claims. (Cl. 103—202)

The present invention relates in general to shaft seals, a primary object of the invention being to provide a shaft seal which prevents wear of the shaft itself by avoiding direct engagement between the shaft and the seal or sealing element.

For convenience in disclosing the invention, it will be considered as embodied in a shaft seal for use with a pump having a rubber impeller, although it will be understood that the invention, in its broader aspects, is not limited thereto. Rubber-impeller pumps are frequently utilized to handle abrasive fluids, such as abrasive slurries, silty water for cooling marine engines, and the like. Under such pumping conditions, shaft seals wear rapidly and quickly score the shaft which they seal, important objects of the invention being to prevent shaft scoring and to provide for ready replacement of seal parts when excessive wear thereof does occur.

Considering the invention more specifically now, the shaft of a rubber-impeller pump includes an end portion which extends into the impeller chamber and to which the impeller is keyed. While various types of keying connections between the pump shaft and the pump impeller may be utilized, a splined connection will be considered hereinafter for convenience without limiting the invention thereto. In such a pump, the impeller must be removed periodically for replacement, as must various parts of the shaft seal of the pump, it thus being an object of the invention to provide an impeller and shaft seal which may be removed from the pump shaft readily for replacement of parts as required.

In order to prevent wear of the shaft itself by the seal or sealing element employed to prevent leakage along the pump shaft from the impeller chamber, an important object of the invention is to provide a tubular seal seat in the form of a sleeve telescoped on and rotating with the shaft, the sealing element engaging the exterior of such sleeve. Thus, any wear produced by the seal, which may be quite rapid when handling abrasive materials, is applied to the sleeve telescoped on the shaft, instead of to the shaft itself, which is an important feature.

Another object is to provide a construction wherein the tubular seal seat may be removed readily while still providing a driving connection between the shaft and the seal seat.

To accomplish the foregoing, an object of the invention is to provide a sleeve, acting as the tubular seal seat, which is provided at one end with a splined portion engaging one end of the splined portion of the shaft, thereby keying the sleeve to the shaft for rotation therewith. The length of the splined portion of the sleeve is considerably less than that of the splined portion of the shaft to permit keying engagement between the impeller and the remainder of the splined portion of the shaft. Thus, the length of the splined portion of the sleeve is just sufficient to provide a keyed connection between the sleeve and the shaft.

With the foregoing construction, the sealing element of the shaft seal engages the exterior of a cylindrical portion of the sleeve which preferably fits over a cylindrical portion of the shaft. Preferably, the impeller and the tubular seal seat make a relatively loose fit on the shaft so that these parts can be removed readily for replacement and to readily expose other parts, such as the sealing element, for possible replacement.

In order to prevent the entry of fluid from the impeller chamber into the space between the impeller and the splined portion of the shaft and into the clearance between the sleeve and the shaft, an object of the invention is to provide a seal on the impeller which also engages the exterior of the cylindrical portion of the sleeve. Thus, the seal on the impeller prevents leakage into the interior of the impeller, and the sealing element of the shaft seal prevents outward leakage along the shaft externally of the sleeve thereon.

Another object is to provide a sealing washer engageable with the exterior of the cylindrical portion of the sleeve between the impeller chamber and the sealing element of the shaft seal, such sealing washer minimizing migration of abrasive particles to the sealing element in engagement with the sleeve so as to minimize scoring of the sleeve.

The foregoing objects, advantages, features and results of the present invention, together with various other objects, advantages, features and results thereof which will be apparent to those skilled in the art, may be attained with the exemplary embodiments of the invention which are illustrated in the accompanying drawing and described in detail hereinafter. Referring to the drawing:

Fig. 1 is a longitudinal sectional view of a rubber-impeller pump which embodies the present invention;

Fig. 2 is a fragmentary, transverse sectional view which is taken along the arrowed broken line 2—2 of Fig. 1 of the drawing; and Fig. 3 is a fragmentary longitudinal sectional view illustrating another embodiment of the invention.

In the embodiment of Figs. 1 and 2 of the drawing, the numeral 10 designates a pump housing which provides an impeller chamber 12 having an open end 14 closed by a cover plate 16 secured by screws 18. Communicating with the opposite end of the impeller chamber 12 is an opening 20 which includes a counterbore 22. Extending axially into the impeller chamber 12 through the opening 20 is a pump shaft 24, the shaft being driven by a motor 26, or other suitable drive means.

The shaft 24 is provided with a splined end portion 28 within the impeller chamber 12, a rubber impeller 30 within the impeller chamber being driven by the shaft 24. More particularly, the impeller 30 includes a rubber hub 32 which is molded around a tubular, internally splined hub or insert 34 telescoped over the splined portion 28 of the shaft 24 and keyed thereto by the respective splines on the insert and the shaft. The outer end of the insert 34, i.e., the end thereof nearest the open end 14 of the impeller chamber 12, is closed by an expansion plug 36 in the particular construction illustrated to prevent entry of fluid into the interior of the insert. Alternatively, the rubber hub 32 may be molded over the outer end of the insert to close same, or the insert may be otherwise closed. As is conventional, the rubber hub 32 carries rubber vanes 38 which are flexed periodically by a cam 40 to produce the pumping action characteristic of rubber-impeller pumps.

Telescoped on the shaft 24 within the opening 20 and projecting into the impeller chamber 12 is a tubular seal seat or sleeve 42 which fits the shaft relatively loosely so that it can be removed readily by hand, the same being true of the impeller insert 34. The sleeve 42 is provided with an internally splined portion 44 and a cylindrical portion 46, the former fitting over and engaging a part of the splined portion 28 of the shaft 24 and the latter fitting over a cylindrical portion of the shaft. The length of the splined portion 44 of the sleeve 42 is just sufficient to provide a driving connection between the shaft 24 and the sleeve, the length of the splined portion of the sleeve being considerably less than the length of the splined portion 28 of the shaft to permit installation of the impeller insert 34 on the splined portion of the shaft also. As will be apparent, the sleeve 42 takes the wear produced by seals to be described so that such wear does not occur in the shaft 24 itself.

Disposed in the counterbore 22 is a seal 48 which includes a sealing element 50 engaging the exterior of the cylindrical portion 46 of the tubular seal seat or sleeve 42. In the particular construction illustrated, the sealing element is a lip seal biased into sealing engagement with the sleeve 42 by a garter spring 52, which may or may not be used. The lip seal is enclosed, at least partially, by a seal retainer 54 which is encircled by a rubber, or a rubber-like, annulus 56 pressed into the counterbore 22. A washer 58 of rubber, or rubber-like material, is also pressed into the counterbore 22 between the seal 48 and the impeller chamber 12 and fits the exterior of the cylindrical portion 46 of the sleeve 42 snugly, thereby minimizing the amount of brasive material which reaches the seal 48 to minimize wear thereof and wear of the sleeve thereadjacent.

In order to prevent abrasive materials from entering the splined connection between the impeller insert 34 and the shaft 24 and from entering the clearance between the sleeve 42 and the shaft 24, the impeller hub 32 is sealed relative to the sleeve 42, as by being provided with an integral lip seal 60 adjacent the sealing washer 58. The lip seal 60 is shown as biased into engagement with the cylindrical portion 46 of the sleeve 42 by a garter spring 62. However, such a spring may be omitted under some conditions.

In the particular construction illustrated, the tubular seal seat or sleeve 42 is simply a sheet metal tube crimped or corrugated at one end to form the splined portion 44 thereof. Thus, the sleeve 42 may be manufactured readily and inexpensively, which is an important feature. However, the sleeve 42 may be manufactured in other ways, as illustrated in the embodiment of Fig. 3 which is described hereinafter, the only essential requirement being that it be provided with internal splines at one end for engagement with the ends of the external splines on the shaft 24.

It will be apparent that with the structure of the present invention, no seal wear of the shaft 24 can occur since all of the seals engage the sleeve 42. Also, when replacement of the impeller 30 and/or parts of the seal 48 is necessary, this may be accomplished readily by removing the cover plate 16, pulling the impeller 30 off the shaft 24, pulling the sleeve 42 off the shaft, and removing any parts of the seal 48 which may need replacement. The impeller and the sleeve may be removed readily without any special tools or equipment in view of the relatively loose fit on the shaft, which is an important feature, especially in marine cooling systems where quick replacement of a pump shaft seal without any special tools may be an urgent matter.

Referring to Fig. 3 of the drawing, the embodiment thereof is similar to that described previously so that identical reference numerals may be employed for corresponding components. The sleeve 42 of Fig. 3 differs from that described previously in being a machined sleeve, instead of a formed sheet metal one. It is sealed with respect to the impeller hub 32 by providing it with annular ribs 70 pressed into an opening 72 in the hub. The seal 48 between the sleeve 42 and the housing 10 in Fig. 3 comprises packing rings 74 adapted to be compressed by a packing gland 76. Lubricant for sealing purposes may be introduced between adjacent ones of the rings 74 through a grooved, apertured ring 78 therebetween by means of a grease fitting 80. The sleeve 42 of Fig. 3 is held against axial movement by snap rings 82. The foregoing represent the significant differences between the embodiment of Fig. 3 and that of Figs. 1 and 2, and it is thought that a further description is unnecessary.

Although I have disclosed exemplary embodiments herein for purposes of illustration, it will be understood that various changes, modifications and substitutions may be incorporated in such embodiments without departing from the spirit of the invention as defined by the patent claims hereinafter appearing.

I claim as my invention:

1. In a pump, the combination of: a shaft having a splined portion adjacent one end thereof and having a cylindrical portion spaced from said end thereof; a sleeve loosely disposed on said shaft for manual installation and removal, said sleeve having at one end thereof a splined portion which fits over and engages a part of said splined portion of said shaft to key said sleeve to said shaft, and said sleeve having adjacent its other end a cylindrical portion which fits over said cylindrical portion of said shaft; seal means engaging the exterior of said cylindrical portion of said sleeve to prevent leakage externally of said sleeve in the direction of the axis of said shaft; an impeller on said shaft and having a splined portion fitting over and engaging the remainder of said splined portion of said shaft, said shaft terminating within said impeller; and means providing a fluid-tight seal between said impeller and said sleeve to prevent fluid leakage between said sleeve and said shaft in the direction of the axis of said shaft.

2. In combination with a shaft having a splined portion at one end and having a cylindrical portion spaced from said end thereof, and an annular sealing element encircling said cylindrical portion of said shaft, a tubular seat for said sealing element which is driven by said shaft and which includes a sheet metal sleeve having at one end a cylindrical portion telescoped over said cylindrical portion of said shaft within and engaged by said sealing element, said sleeve having longitudinally extending, circumferentially spaced internal and external corrugations at its other end to provide internally and externally splined portions, said internally splined portion being telescoped over and engaging said splined portion of said shaft, said internal and external corrugations being formed by wrinkles in said other end of said sleeve which extend entirely through said sleeve in the radial direction, the length of said splined portion of said sleeve being less than that of said splined portion of said shaft.

3. In a pump, the combination of: a shaft having keying means adjacent one end thereof and having a cylindrical portion spaced from said end thereof; a sleeve loosely disposed on said shaft for manual installation and removal, said sleeve having at one end thereof keying means which fits over and engages a part of said keying means on said shaft to key said sleeve to said shaft, and said sleeve having adjacent its other end a cylindrical portion which fits over said cylindrical portion of said shaft; seal means engaging the exterior of said cylindrical portion of said sleeve to prevent leakage externally of said sleeve in the direction of the axis of said shaft; an impeller on said shaft and having keying means fitting over and engaging the remainder of said keying means on said shaft, said shaft terminating within said impeller; and means providing a fluid-tight seal between said impeller and said sleeve to prevent fluid leakage between said sleeve and said shaft in the direction of the axis of said shaft.

References Cited in the file of this patent

UNITED STATES PATENTS

| | | |
|---|---|---|
| 1,808,798 | Urschel | June 9, 1931 |
| 1,840,867 | Rayburn et al. | Jan. 12, 1932 |
| 1,891,267 | Milkowski | Dec. 20, 1932 |
| 2,371,250 | Maroney | Mar. 13, 1945 |
| 2,533,399 | Sadler et al. | Dec. 12, 1950 |
| 2,711,136 | Arnold | June 21, 1955 |
| 2,782,723 | Doble et al. | Feb. 26, 1957 |